United States Patent
Ding et al.

(10) Patent No.: US 11,568,672 B2
(45) Date of Patent: Jan. 31, 2023

(54) TEXTURE DETECTION MODULE, METHOD FOR DRIVING THE SAME AND DISPLAY DEVICE

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Pengpeng Wang, Beijing (CN)

(73) Assignee: BOE Technology Group Co., Ltd., Bejjing (CN)

( * ) Notice: Subject to any disclaimer, the term of this patent is extended or adjusted under 35 U.S.C. 154(b) by 11 days.

(21) Appl. No.: 17/598,796

(22) PCT Filed: Jan. 26, 2021

(86) PCT No.: PCT/CN2021/073738
§ 371 (c)(1),
(2) Date: Sep. 27, 2021

(87) PCT Pub. No.: WO2021/169707
PCT Pub. Date: Sep. 2, 2021

(65) Prior Publication Data
US 2022/0319223 A1    Oct. 6, 2022

(30) Foreign Application Priority Data
Feb. 28, 2020 (CN) .......................... 202010128113.5

(51) Int. Cl.
G06K 9/28 (2006.01)
G06V 40/13 (2022.01)
G06V 40/12 (2022.01)

(52) U.S. Cl.
CPC ...... *G06V 40/1306* (2022.01); *G06V 40/1359* (2022.01)

(58) Field of Classification Search
CPC .................................................. G06V 40/1306
See application file for complete search history.

(56) References Cited

U.S. PATENT DOCUMENTS 6,188,391 B1 * 2/2001 Seely .................... G06F 3/0443
345/173
9,953,205 B1 * 4/2018 Rasmussen ........ G06V 40/1394
(Continued)

FOREIGN PATENT DOCUMENTS

CN     109829419 A     5/2019
CN     110287871 A     9/2019
(Continued)

OTHER PUBLICATIONS

PCT/CN2021/073738 international search report and written opinion.

*Primary Examiner* — Brian Werner
(74) *Attorney, Agent, or Firm* — IPro, PLLC (57) ABSTRACT

The present disclosure provides a texture detection module, a method for driving the same and a display device. The texture detection module includes: an emission electrode layer; a receiver electrode layer; and a piezoelectric film between the emission electrode layer and the receiver electrode layer. The emission electrode layer includes emission electrodes, first emission signal lines and second emission signal lines. The emission electrodes include first emission sub-electrodes and second emission sub-electrodes that are insulated from the first emission sub-electrodes. The first emission sub-electrodes are arranged in N rows and M columns, N and M are both positive integers; the first emission sub-electrodes located in an identical row are electrically coupled to one identical first emission signal line. The second emission sub-electrodes are arranged in X rows and Y columns, X and Y are both positive integers; the (Continued)

second emission sub-electrodes located in an identical column are electrically coupled to one identical second emission signal line.

20 Claims, 5 Drawing Sheets

(56) References Cited

U.S. PATENT DOCUMENTS

| | | |
|---|---|---|
| 2018/0349663 A1 | 12/2018 | Garlepp et al. |
| 2021/0056278 A1 | 2/2021 | Wang et al. |
| 2021/0209334 A1 | 7/2021 | Liu et al. |
| 2021/0303814 A1 | 9/2021 | Liu et al. |

FOREIGN PATENT DOCUMENTS

| | | |
|---|---|---|
| CN | 110472606 A | 11/2019 |
| CN | 111368689 A | 7/2020 |

* cited by examiner

TEXTURE DETECTION MODULE, METHOD FOR DRIVING THE SAME AND DISPLAY DEVICE

CROSS-REFERENCE TO RELATED APPLICATION

The present application is the U.S. national phase of PCT Application No. PCT/CN2021/073738 filed on Jan. 26, 2021, which claims the priority of Chinese patent application No. 202010128113.5, filed on Feb. 28, 2020, which is incorporated herein by reference in its entirety.

TECHNICAL FIELD

The present disclosure relates to the technical field of display technologies, and in particular to a texture detection module, a method for driving the same and a display device.

BACKGROUND

At present, in the ultrasonic fingerprint identification technology, when reflected waves touch textures (fingerprint or palm print), due to differences between valley positions and ridge positions of the textures, vibration intensities of the reflected waves of different textures will be different. Therefore, by detecting the vibration intensities of the reflected waves, valley positions and ridge positions of a finger can be determined, thereby realizing texture identification.

However, regardless of whether the reflected waves are detected by peak detection or amplitude modulation in the related art, there is a problem of low accuracy of texture identification.

SUMMARY

In a first aspect, one embodiment of the present disclosure provides a texture detection module, including: an emission electrode layer; a receiver electrode layer; and a piezoelectric film between the emission electrode layer and the receiver electrode layer. The emission electrode layer includes emission electrodes, first emission signal lines and second emission signal lines; the emission electrodes include first emission sub-electrodes and second emission sub-electrodes that are insulated from the first emission sub-electrodes;

the first emission sub-electrodes are arranged in N rows and M columns, N and M are both positive integers; the first emission sub-electrodes located in an identical row are electrically coupled to one identical first emission signal line;

the second emission sub-electrodes are arranged in X rows and Y columns, X and Y are both positive integers; the second emission sub-electrodes located in an identical column are electrically coupled to one identical second emission signal line.

Further, one row of second emission sub-electrodes are located between two adjacent rows of first emission sub-electrodes; and one column of second emission sub-electrodes are located between two adjacent columns of first emission sub-electrodes.

Further, N and M are greater than or equal to 2, four first emission sub-electrodes are arranged to surround one second emission sub-electrode.

Further, the first emission sub-electrodes located in an identical column are not connected to each other; and the second emission sub-electrodes located in an identical row are not connected to each other.

Further, the first emission signal line and the second emission signal line are arranged in different layers; and the emission electrode layer further includes an insulating layer between the first emission signal line and the second emission signal line.

Further, the first emission signal line includes a first part and a second part; the second emission signal line and the first part are arranged in the same layer, and the second emission signal line is located between two adjacent first parts; the emission electrode layer further includes an insulating layer covering the first part and the second emission signal line; the insulating layer is provided with a via hole, and the second part is connected to two adjacent first portions through the via hole.

Further, each of the first emission sub-electrode and the second emission sub-electrode has a shape of rhombus or a centrally symmetrical hexagon.

Further, the first emission sub-electrodes located in an identical column are electrically connected to one identical second emission signal line; and the second emission sub-electrodes located in an identical row are electrically connected to one identical first emission signal line.

Further, the receiver electrode layer includes a plurality of receiver sub-electrodes; an orthographic projection of each receiver sub-electrode onto the piezoelectric film covers an orthographic projection of at least one target emission sub-electrode onto the piezoelectric film, and does not cover an orthographic projection of other emission sub-electrode onto the piezoelectric film; the target emission sub-electrode and the other emission sub-electrodes are all regarded as the first emission sub-electrodes or second emission sub-electrodes; and the other emission sub-electrodes are the first emission sub-electrode or the second emission sub-electrode except for the target emission sub-electrode.

Further, each of the first emission sub-electrodes and the second emission sub-electrodes is arranged directly opposite to one receiver sub-electrode; and each receiver sub-electrode transmits a voltage signal through a wire.

Further, each receiver sub-electrode is directly opposite to a plurality of target emission sub-electrodes.

Further, the first emission sub-electrodes located in an identical row are all located on an identical first straight line; and the second emission sub-electrodes located in an identical column are all located on an identical second straight line.

Further, the first straight line is perpendicular to the second straight line.

In a second aspect, one embodiment of the present disclosure provides a display device, including the foregoing texture detection module.

In a third aspect, one embodiment of the present disclosure provides a method for controlling a texture detection module, applied to the foregoing texture detection module. The method includes:

in a first time period, controlling a plurality of first emission groups to emit sine wave signals, respectively, and obtaining a first voltage signal, which is generated by the piezoelectric film and collected by receiver electrodes, wherein each first emission group includes at least two rows of first emission sub-electrodes;

in a second time period, controlling a plurality of second emission groups to emit sine wave signals, respectively, and obtaining a second voltage signal, which is generated by the piezoelectric film and collected by the receiver electrodes, wherein the first time period does not overlap with the second time period, and each second emission group includes at least two columns of second emission sub-electrodes; and determining fingerprint information based on the first voltage signal and the second voltage signal.

Further, for the texture detection module according to claim 3, a step of controlling each first emission group to emit sine wave signals, includes:

controlling at least two first signal emission lines to output sine wave signals, respectively, so that sine wave signals emitted by at least two rows of first emission sub-electrodes are focused;

a step of controlling each second emission group to emit sine wave signals, includes:

controlling at least two second signal emission lines to output sine wave signals, respectively, so that sine wave signals emitted by at least two columns of second emission sub-electrodes are focused.

Further, the first emission group includes a third emission sub-electrode, a fourth emission sub-electrode and a fifth emission sub-electrode which are located at two opposite sides of the third emission sub-electrode; the third emission sub-electrode, the fourth emission sub-electrode and the fifth emission sub-electrode are all regarded as the first emission sub-electrodes;

the step of controlling at least two first signal emission lines to output sine wave signals, respectively, so that sine wave signals emitted by at least two rows of first emission sub-electrodes are focused, includes:

controlling the fourth emission sub-electrode and the fifth emission sub-electrode to simultaneously emit out first sine wave signals;

at a preset time point after the fourth emission sub-electrode and the fifth emission sub-electrode emit out the first sine wave signals, controlling the third emission sub-electrode to emit out second sine wave signals, so that the first sine wave signals and the second sine wave signals are focused at a target position; wherein an orthographic projection of the target position onto the emission electrode layer is located within the third emission sub-electrode.

BRIEF DESCRIPTION OF THE DRAWINGS

In order to illustrate technical solutions according to embodiments of the present disclosure more clearly, drawings to be used in the description of the embodiments of the present disclosure will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions according to embodiments of the present disclosure will be described hereinafter in a clear and complete manner in conjunction with the drawings. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
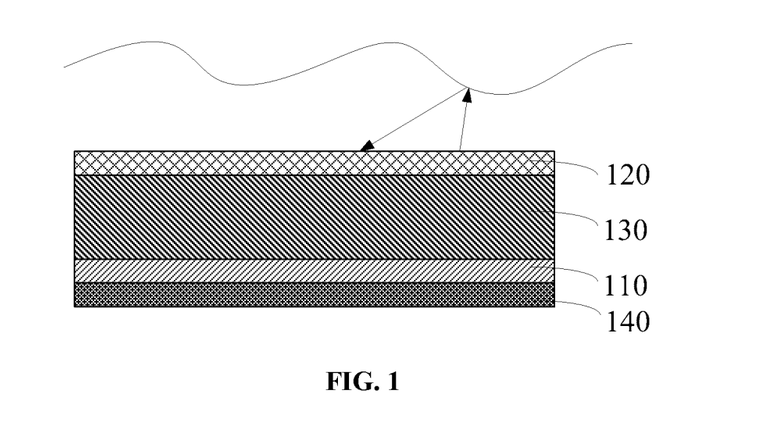
FIG. 1 is a cross-sectional view of a texture detection module according to an embodiment of the present disclosure.
Figure 2:
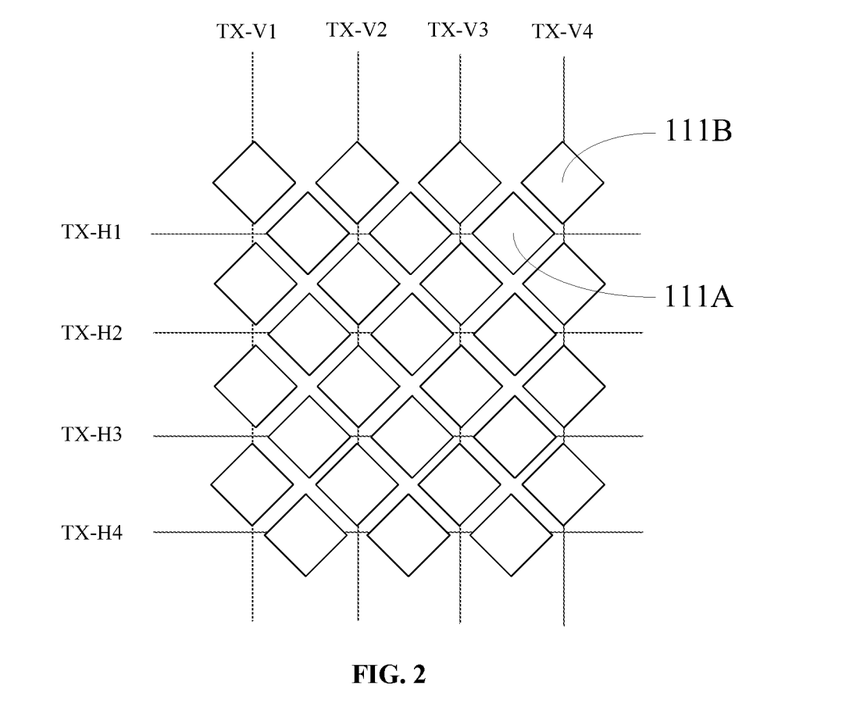
FIG. 2 is a schematic diagram showing an emission electrode layer in a texture detection module according to another embodiment of the present disclosure.

One embodiment of the present disclosure provides a texture detection module. As shown in FIG. 1 and FIG. 2, the texture detection module includes an emission electrode layer 110, a receiver electrode layer 120, and a piezoelectric film 130 between the emission electrode layer 110 and the receiver electrode layer 120. The emission electrode layer 110 includes an emission electrode 111, a first emission signal line TX-H, and a second emission signal line TX-V. The emission electrode 111 includes a first emission sub-electrode 111A and a second emission sub-electrode 111B that are insulated from each other.

Multiple first emission sub-electrodes 111A are arranged in N rows and M columns, where N and M are both positive integers. The first emission sub-electrodes 111A located in an identical row are electrically coupled to an identical first emission signal line TX-H.

Multiple second emission sub-electrodes 111B are arranged in X rows and Y columns, where X and Y are both positive integers. The second emission sub-electrodes 111B located in an identical column are electrically coupled to an identical second emission signal line TX-V.

In the embodiment of the present disclosure, N rows of first emission sub-electrodes provide sine wave signals to the piezoelectric film to excite the piezoelectric film to emit ultrasonic waves in a row direction, so that the receiver electrode layer can collect texture electrical signals corresponding to the row direction from the piezoelectric film; and Y columns of second emission sub-electrodes provide sine wave signals to the piezoelectric film to excite the piezoelectric film to emit ultrasonic waves in a column direction, so that the receiver electrode layer can collect texture electrical signals in the corresponding column direction from the piezoelectric film. Texture identification is performed by combining the texture electrical signals in two directions, thereby improving an accuracy of texture identification. Therefore, the technical solution provided by the present disclosure can improve the accuracy of texture identification.

In the embodiments of the present disclosure, examples are given in form of fingerprint identification, but it is not limited to fingerprint identification, and it may also be identification of palm prints and identification of skin textures of other parts, which is not limited here.

As shown in FIG. 1 and FIG. 2, the foregoing emission electrode layer 110, the piezoelectric film 130 and the receiver electrode layer 120 are sequentially stacked, and the piezoelectric film 130 is in contact with the emission electrode layer 110 and the receiver electrode layer 120, respectively. The first emission signal line TX-H and the second emission signal line TX-V in the emission electrode layer 110 are insulated from each other.

One fingerprint detection process includes an emitting process and a receiving process.

In the emitting process, the emission electrode layer 110 is of a high-voltage sine wave signal, and the receiver electrode layer 120 is of a fixed voltage signal. At this point, the piezoelectric film 130 is excited by the high-voltage sine wave signal of the emission electrode 111 to produce an inverse piezoelectric effect and then emit ultrasonic waves outward. The emitted ultrasonic waves contact a user's finger and then are reflected back to the piezoelectric film 130. Due to differences of different user's fingers and differences of valley positions and ridge positions of fingerprints, vibration intensities of reflected ultrasonic waves are also different. Specifically, a vibration intensity of ultrasonic waves reflected from a valley position is greater than a vibration intensity of ultrasonic waves reflected from a ridge position.

In the receiving process, the emission electrode layer 110 is switched from the high-voltage sine wave signal to a fixed voltage signal, and then the piezoelectric film 130 receives reflected ultrasonic waves and generates a piezoelectric effect. Then, an alternating current voltage signal corresponding to the vibration intensity is generated in the receiver electrode layer 120, and valley positions and ridge positions of the fingerprint can be identified through the alternating current voltage signal, thereby identifying the fingerprint.

In addition, as shown in FIG. 1, a reflective layer 140 may be provided on one side of the emission electrode layer 110 away from the piezoelectric film 130, and is used to reflect the ultrasonic waves emitted by the piezoelectric film 130 to increase probability of the ultrasonic waves emitted by the piezoelectric film 130 being reflected on the finger. An insulating layer may or may not be provided between the reflective layer 140 and the emission electrode layer 110, which is not limited here. The reflective layer 140 may be made of silver material.

In the embodiment of the present disclosure, the foregoing emission electrode layer 110 is divided into first emission sub-electrodes 111A arranged in N rows and M columns, and second emission sub-electrodes 111B arranged in X rows and Y columns. The first emission signal line TX-H is used to provide electrical signals for N rows of first emission sub-electrodes 111A, and the second emission signal line TX-V is used to provide electrical signals for Y columns of second emission sub-electrodes 111B. That is, all the first emission sub-electrodes 111A can be used to detect fingerprints in the row direction, and all the second emission sub-electrode 111B can be used to detect fingerprints in the column direction.

It should be noted that the above-mentioned rows and columns are two mutually perpendicular linear directions. The first emission sub-electrodes located in an identical row are all located on an identical straight line. The second emission sub-electrodes located in an identical column are all located on an identical straight line.

The number of the first emission signal lines TX-H may be N, and each first emission signal line TX-H is coupled to a row of first emission sub-electrodes 111A. The number of the second emission signal lines TX-V may be Y, and each second emission signal line TX-V is coupled to a column of second emission sub-electrodes 111B.

In the fingerprint detection process of the embodiment of the present disclosure, the N rows of first emission sub-electrodes 111A can be used to enable the piezoelectric film 130 to emit ultrasonic waves; and after the receiver electrode layer 120 completes collection of the alternating current voltage signal corresponding to the fingerprint, the Y columns of second emission sub-electrodes 111B can be used to enable the piezoelectric film 130 to emit ultrasonic waves; alternatively, the order may be reversed. Alternatively, P rows of first emission sub-electrodes 111A may be used to enable the piezoelectric film 130 to emit ultrasonic waves; and after the receiver electrode layer 120 completes collection of the alternating current voltage signal corresponding to the fingerprint, Q columns of second emission sub-electrodes 111B may be used to enable the piezoelectric film 130 to emit ultrasonic waves; and then, after the receiver electrode layer 120 completes collection of the alternating current voltage signal corresponding to the fingerprint, the remaining rows of first emission sub-electrodes 111A may then be used to enable the piezoelectric film 130 to emit ultrasonic waves; and after the receiver electrode layer 120 completes collection of the alternating current voltage signal corresponding to the fingerprint, the remaining columns of second emission sub-electrodes 111B can be used to enable the piezoelectric film 130 to emit ultrasonic waves; which is not limited here. The foregoing P is a positive integer less than N, and the foregoing Q is a positive integer less than Y.

In addition, in the embodiment of the present disclosure, ultrasonic focusing may be used to detect fingerprints. Specifically, using N rows of first emission sub-electrodes 111A to enable the piezoelectric film 130 to emit ultrasonic waves, is taken as an example for illustration, in which at least two consecutive rows of first emission sub-electrodes 111A may be used as a group to form an emission source, and ultrasonic waves emitted by the piezoelectric film under excitation of sine wave signals emitted by various rows of first emission sub-electrodes 111A in the emission source are focused on one place by controlling a phase (i.e., a time point when the piezoelectric film 130 is excited to emit ultrasonic waves) of a sine wave signal of each row of first emission sub-electrodes 111A in the emission source.

Figure 3:
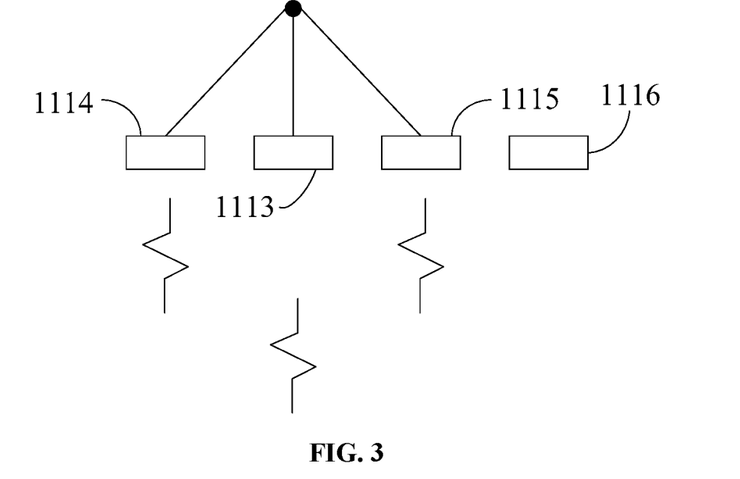
FIG. 3 is a schematic diagram showing ultrasonic focusing of a group of emission sources in a row direction in a texture detection module according to another embodiment of the present disclosure.

For example, as shown in FIG. 3, one emission source includes three rows of first emission sub-electrodes 111A, including a third emission sub-electrode 1113, a fourth emission sub-electrode 1114 and a fifth emission sub-electrode 1115 which are located at two opposite sides of the third emission sub-electrode 1113. The third emission sub-electrode 1113, the fourth emission sub-electrode 1114 and the fifth emission sub-electrode 1115 are all regarded as first emission sub-electrodes 111A.

The fourth emission sub-electrode 1114 and the fifth emission sub-electrode 1115 are controlled to simultaneously emit out first sine wave signals to excite the piezoelectric film 130 to emit ultrasonic waves. At a preset time point after the fourth emission sub-electrode 1114 and the fifth emission sub-electrode 1115 emit out the first sine wave signals, the third emission sub-electrode 1113 is controlled to emit out second sine wave signals to excite the piezoelectric film 130 to emit ultrasonic waves. In this way, the ultrasonic waves excited by the sine wave signals emitted by the three rows of the first emission sub-electrodes 111A can be focused directly above the third emission sub-electrode 1113 (that is, an orthographic projection of a focusing position onto the emission electrode layer 110 is located within the third emission sub-electrode), thereby increasing energy, improving directionality of ultrasonic transmission, and then achieving effects of improving the accuracy of fingerprint detection.

A time difference between a time point when the fourth emission sub-electrode 1114 and the fifth emission sub-electrode 1115 emit the first sine wave signal and the time point when the third emission sub-electrode 1113 emits the second sine wave signal, is a phase difference between the first sine wave signal from the fourth emission sub-electrode 1114 and the fifth emission sub-electrode 1115 and the second sine wave signal from the third emission sub-electrode 1113. The time difference may be calculated according to distance differences of distances between various first emission sub-electrodes 111A and a preset focusing point.

It should be noted that one emission source may also include 4 rows of first emission sub-electrodes 111A, 6 rows of first emission sub-electrodes 111A, 7 rows of first emission sub-electrodes 111A, etc., which are not limited here.

Two emission sources may be independent of each other, that is, there is no shared row of first emission sub-electrodes 111A. Two emission sources may also be partially overlapped, that is, two emission sources may share at least one row of emission sub-electrodes. For example, as shown in FIG. 3, a next emission source includes the third emission sub-electrode 1113 and the fifth emission sub-electrode 1115 of the previous emission source, and a new sixth emission sub-electrode 116. The third emission sub-electrode 113, the fifth emission sub-electrode 1115, and the sixth emission sub-electrode 116 are all regarded as the first emission sub-electrodes 111A.

In addition, using N rows of first emission sub-electrodes 111A to enable the piezoelectric film 130 to emit ultrasonic waves may include that multiple groups of emission sources emit sine wave signals in time sharing to excite the piezoelectric film to emit ultrasonic waves, or, at least two independent groups of emission sources simultaneously emit sine wave signals to excite the piezoelectric film to emit ultrasonic waves, thereby reducing fingerprint detection time.

Figure 4:
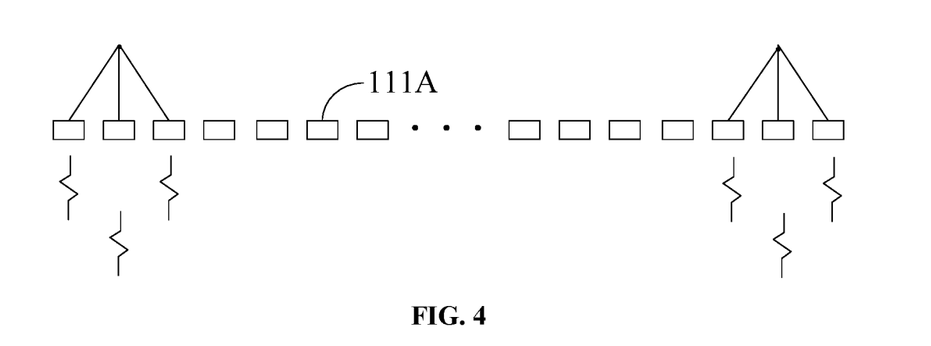
FIG. 4 is a schematic diagram showing ultrasonic focusing of emission sources in a row direction in a texture detection module according to another embodiment of the present disclosure.

Taking at least two independent groups of emission sources simultaneously emitting sine wave signals to excite the piezoelectric film to emit ultrasonic waves as an example, as shown in FIG. 4, two emission sources at head and tail ends of the N rows of first emission sub-electrodes 111A simultaneously emit sine wave signals to excite the piezoelectric film to emit ultrasonic waves, thereby shortening the fingerprint detection time by half.

Using Y columns of second emission sub-electrodes 111B to emit sine wave signals to excite the piezoelectric film to emit ultrasonic waves, is taken as an example for illustration, in which at least two consecutive columns of second emission sub-electrodes 111B may be used as a group to form an emission source, and ultrasonic waves emitted by the piezoelectric film under excitation of sine wave signals emitted by various columns of second emission sub-electrodes 111B in the emission source are focused on one place by controlling a phase (i.e., a time point when the piezoelectric film 130 is excited to emit ultrasonic waves) of a sine wave signal of each column of second emission sub-electrodes 111B in the emission source.

Figure 5:
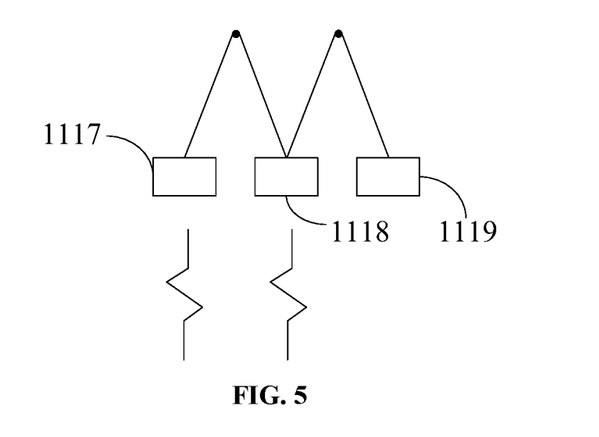
FIG. 5 is a schematic diagram showing ultrasonic focusing of a group of emission sources in a column direction in a texture detection module according to another embodiment of the present disclosure.

For example, as shown in FIG. 5, one emission source includes two columns of second emission sub-electrodes 111B, including a seventh emission sub-electrode 1117 and an eighth emission sub-electrode 1118. The seventh emission sub-electrode 1117 and the eighth emission sub-electrode 1118 are all regarded as second emission sub-electrodes 111B.

The seventh emission sub-electrode 1117 and the eighth emission sub-electrode 1118 are controlled to simultaneously emit out sine wave signals to excite the piezoelectric film to emit ultrasonic waves, so that the ultrasonic waves emitted by the piezoelectric film under excitation of the sine wave signals emitted by the two columns of second emission sub-electrodes 111B can be focused directly above a gap between the seventh emission sub-electrode 1117 and the eighth emission sub-electrode 1118, thereby increasing energy, improving directionality of ultrasonic transmission, and then achieving effects of improving the accuracy of fingerprint detection.

It should be noted that one emission source may also include 4 columns of second emission sub-electrodes 111B, 6 columns of second emission sub-electrodes 111B, 7 columns of second emission sub-electrodes 111B, etc., which are not limited here.

Two emission sources may be independent of each other, that is, there is no shared column of second emission sub-electrodes 111B. Two emission sources may also be partially overlapped, that is, two emission sources may share at least one column of second emission sub-electrodes 111B. For example, as shown in FIG. 5, a next emission source includes the eighth emission sub-electrode 1118 of the previous emission source, and a new ninth emission sub-electrode 119. The eighth emission sub-electrode 1118 and the ninth emission sub-electrode 119 are all regarded as the second emission sub-electrodes 111B.

In addition, using Y columns of second emission sub-electrodes 111B to enable the piezoelectric film 130 to emit ultrasonic waves may include that multiple groups of emission sources emit sine wave signals in time sharing to excite the piezoelectric film to emit ultrasonic waves, or, at least two independent groups of emission sources simultaneously emit sine wave signals to excite the piezoelectric film to emit ultrasonic waves, thereby reducing fingerprint detection time.

Figure 6:
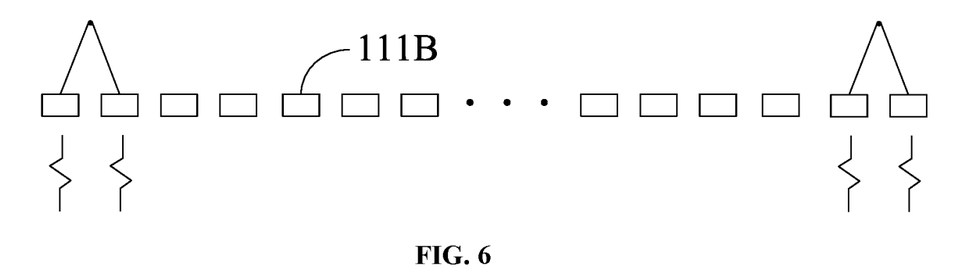
FIG. 6 is a schematic diagram showing ultrasonic focusing of emission sources in a column direction in a texture detection module according to another embodiment of the present disclosure.

Taking at least two independent groups of emission sources simultaneously emitting sine wave signals to excite the piezoelectric film to emit ultrasonic waves as an example, as shown in FIG. 6, two emission sources at head and tail ends of the Y columns of second emission sub-electrodes 111B simultaneously emit sine wave signals to excite the piezoelectric film to emit ultrasonic waves, thereby shortening the fingerprint detection time by half.

In the embodiment of the present disclosure, either after the N rows of first emission sub-electrodes 111A have completed emission, the Y columns of second emission sub-electrodes 111B start emission; or, after a part of rows of the first emission sub-electrodes 111A have completed emission, a part of columns of second emission sub-electrodes 111B perform emission, then another part of rows of the first emission sub-electrodes 111A perform emission, and then another part of columns of second emission sub-electrodes 111B perform emission, the texture detection module can use the receiver electrode layer 120 to collect a first voltage signal generated by the piezoelectric film under excitation of ultrasonic waves which are emitted from the row direction, focused and then reflected by the fingerprint back to the piezoelectric film, and a second voltage signal generated by the piezoelectric film under excitation of ultrasonic waves which are emitted from the column direction, focused and then reflected by the fingerprint back to the piezoelectric film, thereby realizing two-dimensional focus detection of fingerprints and improving the accuracy of texture detection.

Figure 7:
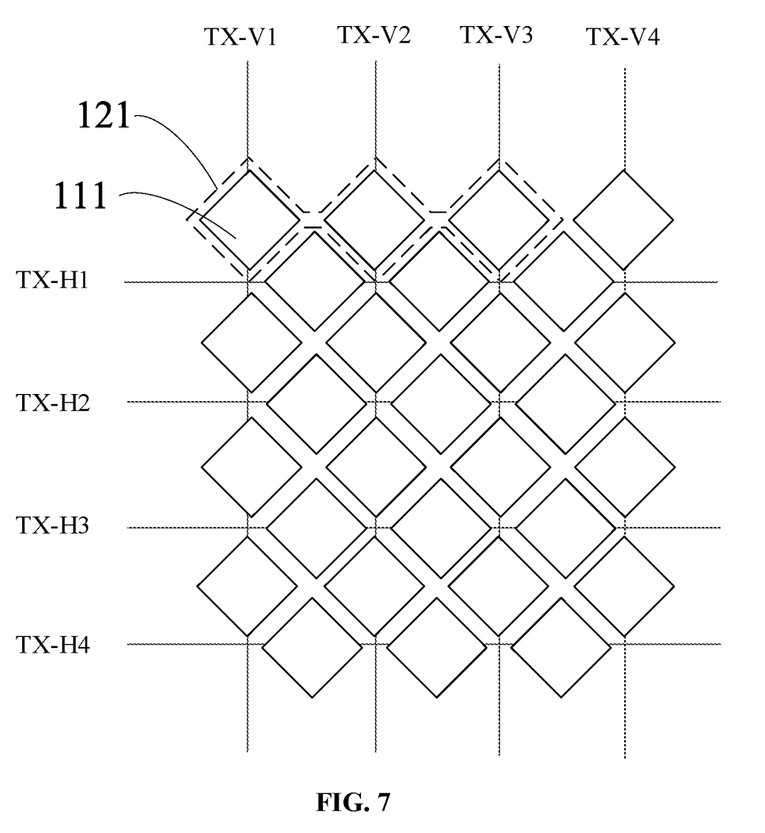
FIG. 7 is a schematic diagram showing positions of a receiver sub-electrode and an emission sub-electrode in a texture detection module according to another embodiment of the present disclosure.

Furthermore, as shown in FIG. 7, the receiver electrode layer 120 includes a plurality of receiver sub-electrodes 121. An orthographic projection of each receiver sub-electrode 121 onto the piezoelectric film 130 covers an orthographic projection of at least one target emission sub-electrode 111 onto the piezoelectric film 130, and does not cover an orthographic projection of other emission sub-electrode onto the piezoelectric film 130. The target emission sub-electrode 111 and the other emission sub-electrodes are all regarded as first emission sub-electrodes 111A or second emission sub-electrodes 111B. The other emission sub-electrodes are the first emission sub-electrode 111A or the second emission sub-electrode 111B except for the target emission sub-electrode 111.

In this embodiment, each first emission sub-electrode 111A or each second emission sub-electrode 111B is arranged directly opposite to one receiver sub-electrode 121. Each receiver sub-electrode 121 transmits a voltage signal through a wire.

The number of receiver sub-electrodes 121 may be a sum of the first emission sub-electrodes 111A and the second emission sub-electrodes 111B, so that each receiver sub-electrode 121 is arranged directly opposite to one first emission sub-electrode 111A or one second emission sub-electrode 111B. An area of the receiver sub-electrode 121 is greater than or equal to an area of the first emission sub-electrode 111A or the second emission sub-electrode 111B.

However, due to the large number of receiver sub-electrodes 121, there are also many wires, which makes it difficult to design the wires. Therefore, the voltage signal generated by the piezoelectric film 130 under excitation of reflected ultrasonic waves may be collected the receiver sub-electrodes 121 each facing multiple target emission sub-electrodes 111, thereby reducing the number of wires connected to the receiver sub-electrode 121.

As shown in FIG. 7, one receiver sub-electrode 121 is directly opposite to three target emission sub-electrodes 111. That is, an orthographic projection of one receiver sub-electrode 121 onto the piezoelectric film 130 covers an orthographic projection of three target emission sub-electrodes 111 onto the piezoelectric film 130, and does not cover an orthographic projection of other emission sub-electrodes onto the piezoelectric film 130.

In this embodiment, after the ultrasonic waves emitted by the piezoelectric film 130 under excitation of each emission source is reflected by the texture back to the piezoelectric film 130, the entire layer of the receiver electrode layer 120 receives electrical signals generated by the piezoelectric film 130 through piezoelectric effect.

Further, as shown in FIG. 2, one row of second emission sub-electrodes 111B are located between two adjacent rows of first emission sub-electrodes 111A, and one column of second emission sub-electrodes 111B are located between two adjacent columns of first emission sub-electrodes 111A.

In this embodiment, each row of second emission sub-electrodes 111B is arranged in a gap between two adjacent rows of first emission sub-electrodes 111A, and each column of second emission sub-electrodes 111B is arranged in a gap between two adjacent columns of first emission sub-electrodes, thereby integrating the second emission sub-electrodes 111B in the first emission sub-electrodes 111A.

In this way, for the same area, the first emission sub-electrodes 111A and the second emission sub-electrodes 111B can excite ultrasonic waves from the row direction to detect fingerprints and excite ultrasonic waves from the column direction to detect fingerprints, respectively.

As shown in FIG. 2, when N and M are greater than or equal to 2, four first emission sub-electrodes 111A are arranged to surround one second emission sub-electrode 111.

Figure 8A:
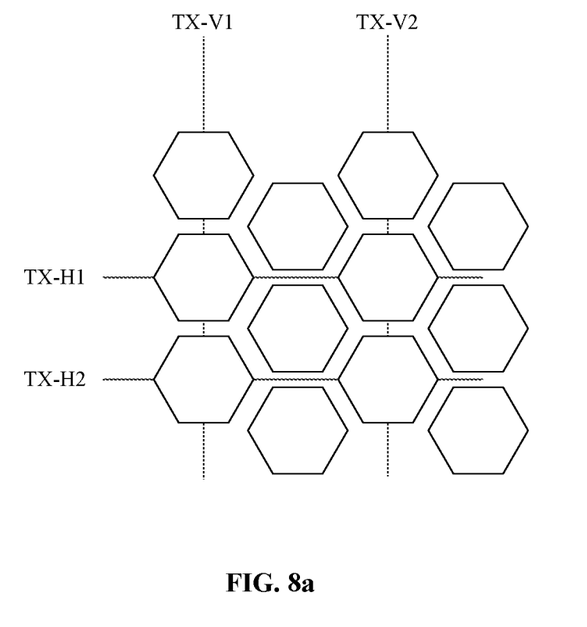
FIG. 8a is a first schematic diagram showing an emission electrode layer in a texture detection module according to another embodiment of the present disclosure.
Figure 8B:
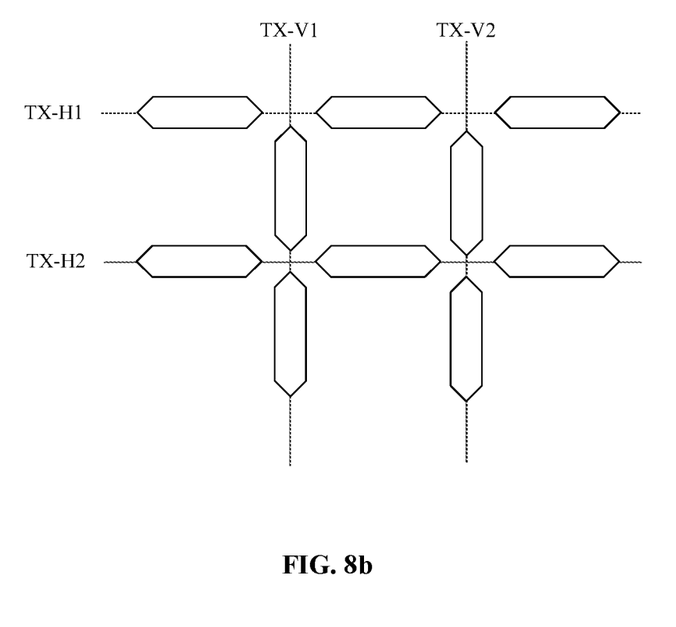
FIG. 8b is a second schematic diagram showing an emission electrode layer in a texture detection module according to another embodiment of the present disclosure.

Further, the first emission sub-electrode 111A and the second emission sub-electrode 111B each may have a shape of rhombus (as shown in FIG. 2) or a centrally symmetrical hexagon (as shown in FIG. 8a and FIG. 8b).

Further, as shown in FIG. 2, the first emission sub-electrodes 111A located in an identical column are not connected to each other, and the second emission sub-electrodes 111B located in an identical row are not connected to each other.

In this embodiment, each emission sub-electrode 111 is connected to only one first emission signal line TX-H or one second emission signal line TX-V. Therefore, one first emission sub-electrode 111A will only generate sine wave signals at the same time as other first emission sub-electrodes 111A in the same row, and will not generate sine wave signals at the same time as other first emission sub-electrodes 111A in the same column. Similarly, one second emission sub-electrode 111B will only generate sine wave signals at the same time as other second emission sub-electrodes 111B in the same column, and will not generate sine wave signals at the same time as other second emission sub-electrodes 111B in the same row.

Figure 9:
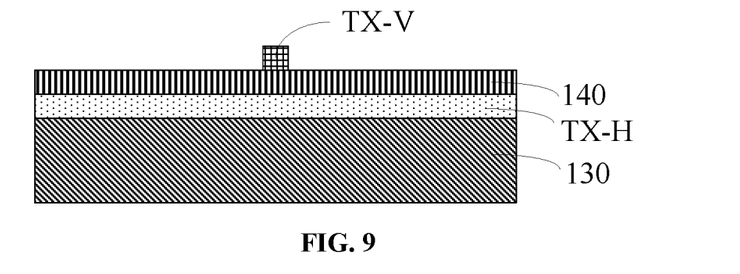
FIG. 9 is a first schematic diagram showing film layers of a first emission signal line and a second emission signal line according to an embodiment of the present disclosure.

In an optional embodiment, as shown in FIG. 9, the first emission signal line TX-H and the second emission signal line TX-V are arranged in different layers, and the emission electrode layer 110 further includes an insulating layer 140 between the first emission signal line and the second emission signal line.

FIG. 9 is a cross-sectional view at an intersection of the first emission signal line TX-H and the second emission signal line TX-V with a cross-section line being parallel to an extension direction of the first emission signal line TX-H.

In this embodiment, the first emission signal line TX-H and the second emission signal line TX-V are arranged in different layers. In an intersection area of the first emission signal line TX-H and the second emission signal line TX-V, as shown in FIG. 5, they are insulated from each other by the insulating layer 140, thereby preventing electrical signals of the first emission signal line TX-H and electrical signals of the second emission signal line TX-V from interfering with each other.

Figure 10:
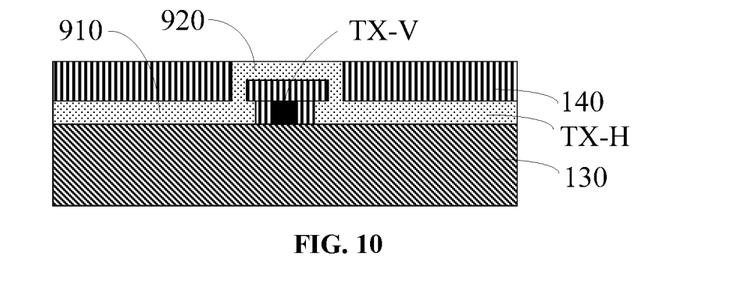
FIG. 10 is a second schematic diagram showing film layers of a first emission signal line and a second emission signal line according to an embodiment of the present disclosure.

In another optional embodiment, as shown in FIG. 10, the first emission signal line TX-H includes a first part 910 and a second part 920. The second emission signal line TX-V and the first part 910 are arranged in the same layer and the second emission signal line TX-V is located between two adjacent first parts 910. The emission electrode layer 110 further includes an insulating layer 140 covering the first part 910 and the second emission signal line TX-V. The insulating layer 140 is provided with a via hole, and the second part 920 is connected to two adjacent first portions 910 through the via hole.

FIG. 10 is a cross-sectional view at an intersection of the first emission signal line TX-H and the second emission signal line TX-V with a cross-section line being parallel to an extension direction of the first emission signal line TX-H.

In this embodiment, the first part 910 of the first emission signal line TX-H and the second emission signal line TX-V are arranged in the same layer. In an intersection area of the first emission signal line TX-H and the second emission signal line TX-V, as shown in FIG. 10, the second emission signal line TX-V is located in a gap between two adjacent first parts 910, and is spaced apart from the first parts 910.

The first part 910 of the first emission signal line TX-H and the second emission signal line TX-V are covered by the insulating layer 140, and the second part 920 is connected to two adjacent first parts 910 through the via hole in the insulating layer 140, thereby realizing signal transmission of two adjacent first parts 910 in the row direction.

Figure 11:
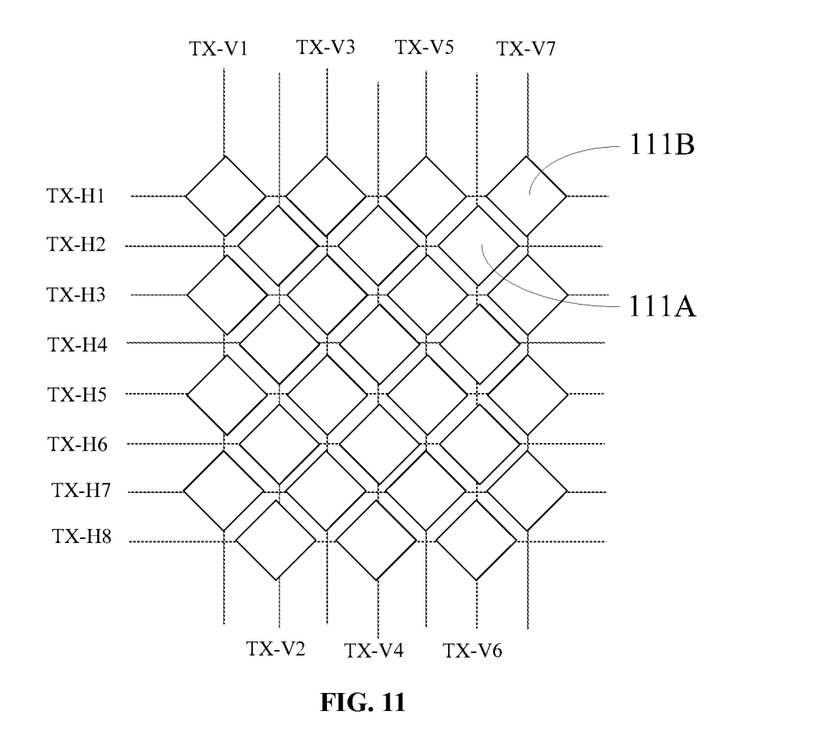
FIG. 11 is a schematic diagram showing an emission electrode layer in a texture detection module according to another embodiment of the present disclosure.

Further, as shown in FIG. 11, the first emission sub-electrodes 111A located in an identical column are electrically connected to an identical second emission signal line TX-V, and the second emission sub-electrodes 111B located in an identical row are electrically connected to an identical first emission signal line TX-H.

In this embodiment, with the same number of emission sub-electrodes 111, in a stage of using the emission sub-electrodes 111 in the row direction to emit sine wave signals, in addition to using the original N rows of first emission sub-electrodes 111A to emit sine wave signals, X columns of second emission sub-electrodes 111B may be also used to emit sine wave signals. Similarly, in a stage of using the emission sub-electrodes 111 in the column direction to emit sine wave signals, in addition to using the original Y columns of second emission sub-electrodes 111B to emit sine wave signals, M columns of first emission sub-electrodes 111A may be also used to emit sine wave signals.

In this way, the accuracy of fingerprint identification can be further increased by increasing an amount of ultrasonic reflection data.

One embodiment of the present disclosure further provides a display device including the foregoing texture detection module.

The display device may be a monitor, a mobile phone, a tablet computer, a television, a wearable electronic device, a navigation display apparatus, and the like.

One embodiment of the present disclosure further provides a method for controlling a texture detection module. The method includes:

in a first time period, controlling multiple first emission groups to emit sine wave signals, respectively, and obtaining a first voltage signal, which is generated by a piezoelectric film and collected by receiver electrodes, where each first emission group includes at least two rows of first emission sub-electrodes;

in a second time period, controlling multiple second emission groups to emit sine wave signals, respectively, and obtaining a second voltage signal, which is generated by the piezoelectric film and collected by the receiver electrodes, where the first time period does not overlap with the second time period, and each second emission group includes at least two columns of second emission sub-electrodes; and determining fingerprint information based on the first voltage signal and the second voltage signal.

In the embodiment of the present disclosure, N rows of first emission sub-electrodes provide sine wave signals to the piezoelectric film to excite the piezoelectric film to emit ultrasonic waves in a row direction, so that the receiver electrode layer can collect texture electrical signals corresponding to the row direction from the piezoelectric film; and Y columns of second emission sub-electrodes provide sine wave signals to the piezoelectric film to excite the piezoelectric film to emit ultrasonic waves in a column direction, so that the receiver electrode layer can collect texture electrical signals in the corresponding column direction from the piezoelectric film. Texture identification is performed by combining the texture electrical signals in two directions, thereby improving an accuracy of texture identification. Therefore, the technical solution provided by the present disclosure can improve the accuracy of texture identification.

As shown in FIG. 1 and FIG. 2, the foregoing emission electrode layer 110, the piezoelectric film 130 and the receiver electrode layer 120 are sequentially stacked, and the piezoelectric film 130 is in contact with the emission electrode layer 110 and the receiver electrode layer 120, respectively.

One fingerprint detection process includes an emitting process and a receiving process.

In the emitting process, the emission electrode layer 110 is of a high-voltage sine wave signal, and the receiver electrode layer 120 is of a fixed voltage signal. At this point, the piezoelectric film 130 is excited by the high-voltage sine wave signal of the emission electrode 111 to produce an inverse piezoelectric effect and then emit ultrasonic waves outward. The emitted ultrasonic waves contact a user's finger and then are reflected back to the piezoelectric film 130. Due to differences of different user's fingers and differences of valley positions and ridge positions of fingerprints, vibration intensities of reflected ultrasonic waves are also different. Specifically, a vibration intensity of ultrasonic waves reflected from a valley position is greater than a vibration intensity of ultrasonic waves reflected from a ridge position.

In the receiving process, the emission electrode layer 110 is switched from the high-voltage sine wave signal to a fixed voltage signal, and then the piezoelectric film 130 receives reflected ultrasonic waves and generates a piezoelectric effect. Then, an alternating current voltage signal corresponding to the vibration intensity is generated in the receiver electrode layer 120, and valley positions and ridge positions of the fingerprint can be identified through the alternating current voltage signal, thereby identifying the fingerprint.

In addition, as shown in FIG. 1, a reflective layer 140 may be provided on one side of the emission electrode layer 110 away from the piezoelectric film 130, and is used to reflect the ultrasonic waves emitted by the piezoelectric film 130 to increase probability of the ultrasonic waves emitted by the piezoelectric film 130 being reflected on the finger. An insulating layer may or may not be provided between the reflective layer 140 and the emission electrode layer 110, which is not limited here. The reflective layer 140 may be made of silver material.

The foregoing first voltage signal is a corresponding voltage signal received by the receiver electrode layer 120 and generated by the piezoelectric film under excitation of ultrasonic waves which are emitted from the piezoelectric film in the row direction, focused and then reflected by the fingerprint back to the piezoelectric film. The foregoing second voltage signal is a corresponding voltage signal received by the receiver electrode layer 120 and generated by the piezoelectric film under excitation of ultrasonic waves which are emitted from the piezoelectric film in the column direction, focused and then reflected by the fingerprint back to the piezoelectric film.

In the embodiment of the present disclosure, the foregoing emission electrode layer 110 is divided into first emission sub-electrodes 111A arranged in N rows and M columns, and second emission sub-electrodes 111B arranged in X rows and Y columns. The first emission signal line TX-H is used to provide electrical signals for N rows of first emission sub-electrodes 111A, and the second emission signal line TX-V is used to provide electrical signals for Y columns of second emission sub-electrodes 111B. That is, all the first emission sub-electrodes 111A can be used to detect fingerprints in the row direction, and all the second emission sub-electrode 111B can be used to detect fingerprints in the column direction.

The number of the first emission signal lines TX-H may be N, and each first emission signal line TX-H is coupled to a row of first emission sub-electrodes 111A. The number of the second emission signal lines TX-V may be Y, and each second emission signal line TX-V is coupled to a column of second emission sub-electrodes 111B.

In the fingerprint detection process of the embodiment of the present disclosure, the N rows of first emission sub-electrodes 111A can be used to enable the piezoelectric film 130 to emit ultrasonic waves; and after the receiver electrode layer 120 completes collection of the alternating current voltage signal corresponding to the fingerprint, the Y columns of second emission sub-electrodes 111B can be used to enable the piezoelectric film 130 to emit ultrasonic waves; alternatively, the order may be reversed. Alternatively, P rows of first emission sub-electrodes 111A may be used to enable the piezoelectric film 130 to emit ultrasonic waves; and after the receiver electrode layer 120 completes collection of the alternating current voltage signal corresponding to the fingerprint, Q columns of second emission sub-electrodes 111B may be used to enable the piezoelectric film 130 to emit ultrasonic waves; and then, after the receiver electrode layer 120 completes collection of the alternating current voltage signal corresponding to the fingerprint, the remaining rows of first emission sub-electrodes 111A may then be used to enable the piezoelectric film 130 to emit ultrasonic waves; and after the receiver electrode layer 120 completes collection of the alternating current voltage signal corresponding to the fingerprint, the remaining columns of second emission sub-electrodes 111B can be used to enable the piezoelectric film 130 to emit ultrasonic waves; which is not limited here. The foregoing P is a positive integer less than N, and the foregoing Q is a positive integer less than Y.

Further, steps of controlling each first emission group to emit sine wave signals, include:

controlling at least two first signal emission lines to output sine wave signals, respectively, so that sine wave signals emitted by at least two rows of first emission sub-electrodes are focused.

Steps of controlling each second emission group to emit sine wave signals, include:

controlling at least two second signal emission lines to output sine wave signals, respectively, so that sine wave signals emitted by at least two columns of second emission sub-electrodes are focused.

In this embodiment, ultrasonic focusing is used to detect fingerprints. Specifically, using N rows of first emission sub-electrodes 111A to enable the piezoelectric film 130 to emit ultrasonic waves, is taken as an example for illustration, in which at least two consecutive rows of first emission sub-electrodes 111A may be used as an emission group to form an emission source, and ultrasonic waves emitted by the piezoelectric film under excitation of sine wave signals emitted by various rows of first emission sub-electrodes 111A in the emission source are focused on one place by controlling a phase (i.e., a time point when the piezoelectric film 130 is excited to emit ultrasonic waves) of a sine wave signal of each row of first emission sub-electrodes 111A in the emission source.

For example, as shown in FIG. 3, one emission source includes three rows of first emission sub-electrodes 111A, including a third emission sub-electrode 1113, a fourth emission sub-electrode 1114 and a fifth emission sub-electrode 1115 which are located at two opposite sides of the third emission sub-electrode 1113. The third emission sub-electrode 1113, the fourth emission sub-electrode 1114 and the fifth emission sub-electrode 1115 are all regarded as first emission sub-electrodes 111A.

The fourth emission sub-electrode 1114 and the fifth emission sub-electrode 1115 are controlled to simultaneously emit out first sine wave signals to excite the piezoelectric film 130 to emit ultrasonic waves. At a preset time point after the fourth emission sub-electrode 1114 and the fifth emission sub-electrode 1115 emit out the first sine wave signals, the third emission sub-electrode 1113 is controlled to emit out second sine wave signals to excite the piezoelectric film 130 to emit ultrasonic waves. In this way, the ultrasonic waves excited by the sine wave signals emitted by the three rows of the first emission sub-electrodes 111A can be focused directly above the third emission sub-electrode 1113 (that is, an orthographic projection of a focusing position onto the emission electrode layer 110 is located within the third emission sub-electrode), thereby increasing energy, improving directionality of ultrasonic transmission, and then achieving effects of improving the accuracy of fingerprint detection.

A time difference between a time point when the fourth emission sub-electrode 1114 and the fifth emission sub-electrode 1115 emit the first sine wave signal and the time point when the third emission sub-electrode 1113 emits the second sine wave signal, is a phase difference between the first sine wave signal from the fourth emission sub-electrode 1114 and the fifth emission sub-electrode 1115 and the second sine wave signal from the third emission sub-electrode 1113. The time difference may be calculated according to distance differences of distances between various first emission sub-electrodes 111A and a preset focusing point.

It should be noted that one emission source may also include 4 rows of first emission sub-electrodes 111A, 6 rows of first emission sub-electrodes 111A, 7 rows of first emission sub-electrodes 111A, etc., which are not limited here.

Two emission sources may be independent of each other, that is, there is no shared row of first emission sub-electrodes 111A. Two emission sources may also be partially overlapped, that is, two emission sources may share at least one row of emission sub-electrodes. For example, as shown in FIG. 3, a next emission source includes the third emission sub-electrode 1113 and the fifth emission sub-electrode 1115 of the previous emission source, and a new sixth emission sub-electrode 116. The third emission sub-electrode 113, the fifth emission sub-electrode 1115, and the sixth emission sub-electrode 116 are all regarded as the first emission sub-electrodes 111A.

In addition, using N rows of first emission sub-electrodes 111A to enable the piezoelectric film 130 to emit ultrasonic waves may include that multiple groups of emission sources emit sine wave signals in time sharing to excite the piezoelectric film to emit ultrasonic waves, or, at least two independent groups of emission sources simultaneously emit sine wave signals to excite the piezoelectric film to emit ultrasonic waves, thereby reducing fingerprint detection time.

Taking at least two independent groups of emission sources simultaneously emitting sine wave signals to excite the piezoelectric film to emit ultrasonic waves as an example, as shown in FIG. 4, two emission sources at head and tail ends of the N rows of first emission sub-electrodes 111A simultaneously emit sine wave signals to excite the piezoelectric film to emit ultrasonic waves, thereby shortening the fingerprint detection time by half.

Using Y columns of second emission sub-electrodes 111B to emit sine wave signals to excite the piezoelectric film to emit ultrasonic waves, is taken as an example for illustration, in which at least two consecutive columns of second emission sub-electrodes 111B may be used as a emission group to form an emission source, and ultrasonic waves emitted by the piezoelectric film under excitation of sine wave signals emitted by various columns of second emission sub-electrodes 111B in the emission source are focused on one place by controlling a phase (i.e., a time point when the piezoelectric film 130 is excited to emit ultrasonic waves) of a sine wave signal of each column of second emission sub-electrodes 111B in the emission source.

For example, as shown in FIG. 5, one emission source includes two columns of second emission sub-electrodes 111B, including a seventh emission sub-electrode 1117 and an eighth emission sub-electrode 1118. The seventh emission sub-electrode 1117 and the eighth emission sub-electrode 1118 are all regarded as second emission sub-electrodes 111B.

The seventh emission sub-electrode 1117 and the eighth emission sub-electrode 1118 are controlled to simultaneously emit out sine wave signals to excite the piezoelectric film to emit ultrasonic waves, so that the ultrasonic waves emitted by the piezoelectric film under excitation of the sine wave signals emitted by the two columns of second emission sub-electrodes 111B can be focused directly above a gap between the seventh emission sub-electrode 1117 and the eighth emission sub-electrode 1118, thereby increasing energy, improving directionality of ultrasonic transmission, and then achieving effects of improving the accuracy of fingerprint detection.

It should be noted that one emission source may also include 4 columns of second emission sub-electrodes 111B, 6 columns of second emission sub-electrodes 111B, 7 columns of second emission sub-electrodes 111B, etc., which are not limited here.

Two emission sources may be independent of each other, that is, there is no shared column of second emission sub-electrodes 111B. Two emission sources may also be partially overlapped, that is, two emission sources may share at least one column of second emission sub-electrodes 111B. For example, as shown in FIG. 5, a next emission source includes the eighth emission sub-electrode 1118 of the previous emission source, and a new ninth emission sub-electrode 119. The eighth emission sub-electrode 1118 and the ninth emission sub-electrode 119 are all regarded as the second emission sub-electrodes 111B.

In addition, using Y columns of second emission sub-electrodes 111B to enable the piezoelectric film 130 to emit ultrasonic waves may include that multiple groups of emission sources emit sine wave signals in time sharing to excite the piezoelectric film to emit ultrasonic waves, or, at least two independent groups of emission sources simultaneously emit sine wave signals to excite the piezoelectric film to emit ultrasonic waves, thereby reducing fingerprint detection time.

Taking at least two independent groups of emission sources simultaneously emitting sine wave signals to excite the piezoelectric film to emit ultrasonic waves as an example, as shown in FIG. 6, two emission sources at head and tail ends of the Y columns of second emission sub-electrodes 111B simultaneously emit sine wave signals to excite the piezoelectric film to emit ultrasonic waves, thereby shortening the fingerprint detection time by half.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Such words as "comprises" or "include" mean that an element or object appearing before the word covers elements or objects listed after the word and their equivalents, but do not exclude other elements or objects. Similarly, such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

It will be understood that when an element such as a layer, film, region, or substrate is referred to as being "on" or "under" another element, this element may be "directly" on or "under" the other element, or, there may be an intermediate element therebetween.

The embodiments of the present disclosure are described above with reference to the accompanying drawings, but the present disclosure is not limited to the foregoing specific embodiments. The foregoing specific embodiments are only illustrative and not restrictive. It should be noted that, a person skilled in the art may make improvements and modifications without departing from the principle of the present disclosure, and these improvements and modifications shall also fall within the scope of the present disclosure.

What is claimed is:

1. A texture detection module, comprising:
    an emission electrode layer;
    a receiver electrode layer; and
    a piezoelectric film between the emission electrode layer and the receiver electrode layer;
    wherein the emission electrode layer includes emission electrodes, first emission signal lines and second emission signal lines; the emission electrodes include first emission sub-electrodes and second emission sub-electrodes that are insulated from the first emission sub-electrodes;
    the first emission sub-electrodes are arranged in N rows and M columns, N and M are both positive integers; the first emission sub-electrodes located in an identical row are electrically coupled to one identical first emission signal line;
    the second emission sub-electrodes are arranged in X rows and Y columns, X and Y are both positive integers; the second emission sub-electrodes located in an identical column are electrically coupled to one identical second emission signal line.

2. The texture detection module according to claim 1, wherein one row of second emission sub-electrodes are located between two adjacent rows of first emission sub-electrodes; and one column of second emission sub-electrodes are located between two adjacent columns of first emission sub-electrodes.

3. The texture detection module according to claim 2, wherein N and M are greater than or equal to 2, four first emission sub-electrodes are arranged to surround one second emission sub-electrode.

4. The texture detection module according to claim 2, wherein the first emission sub-electrodes located in an identical column are not connected to each other; and the second emission sub-electrodes located in an identical row are not connected to each other.

5. The texture detection module according to claim 4, wherein the first emission signal line and the second emission signal line are arranged in different layers; and the emission electrode layer further includes an insulating layer between the first emission signal line and the second emission signal line.

6. The texture detection module according to claim 4, wherein the first emission signal line includes a first part and a second part; the second emission signal line and the first part are arranged in the same layer, and the second emission signal line is located between two adjacent first parts; the emission electrode layer further includes an insulating layer covering the first part and the second emission signal line; the insulating layer is provided with a via hole, and the second part is connected to two adjacent first portions through the via hole.

7. The texture detection module according to claim 2, wherein each of the first emission sub-electrode and the second emission sub-electrode has a shape of rhombus or a centrally symmetrical hexagon.

8. The texture detection module according to claim 1, wherein the first emission sub-electrodes located in an identical column are electrically connected to one identical second emission signal line; and the second emission sub-electrodes located in an identical row are electrically connected to one identical first emission signal line.

9. The texture detection module according to claim 1, wherein the receiver electrode layer includes a plurality of receiver sub-electrodes; an orthographic projection of each receiver sub-electrode onto the piezoelectric film covers an orthographic projection of at least one target emission sub-electrode onto the piezoelectric film, and does not cover an orthographic projection of other emission sub-electrode onto the piezoelectric film; the target emission sub-electrode and the other emission sub-electrodes are all regarded as the first emission sub-electrodes or second emission sub-electrodes; and the other emission sub-electrodes are the first emission sub-electrode or the second emission sub-electrode except for the target emission sub-electrode.

10. The texture detection module according to claim 9, wherein each of the first emission sub-electrodes and the second emission sub-electrodes is arranged directly opposite to one receiver sub-electrode; and each receiver sub-electrode transmits a voltage signal through a wire.

11. The texture detection module according to claim 9, wherein each receiver sub-electrode is directly opposite to a plurality of target emission sub-electrodes.

12. The texture detection module according to claim 1, wherein the first emission sub-electrodes located in an identical row are all located on an identical first straight line; and the second emission sub-electrodes located in an identical column are all located on an identical second straight line.

13. The texture detection module according to claim 12, wherein the first straight line is perpendicular to the second straight line.

14. A display device, comprising: a texture detection module;
wherein the texture detection module includes:
an emission electrode layer;
a receiver electrode layer; and
a piezoelectric film between the emission electrode layer and the receiver electrode layer;
wherein the emission electrode layer includes emission electrodes, first emission signal lines and second emission signal lines; the emission electrodes include first emission sub-electrodes and second emission sub-electrodes that are insulated from the first emission sub-electrodes;
the first emission sub-electrodes are arranged in N rows and M columns, N and M are both positive integers; the first emission sub-electrodes located in an identical row are electrically coupled to one identical first emission signal line;
the second emission sub-electrodes are arranged in X rows and Y columns, X and Y are both positive integers; the second emission sub-electrodes located in an identical column are electrically coupled to one identical second emission signal line.

15. A method for controlling a texture detection module, applied to the texture detection module according to claim 1, comprising:
in a first time period, controlling a plurality of first emission groups to emit sine wave signals, respectively, and obtaining a first voltage signal, which is generated by the piezoelectric film and collected by receiver electrodes, wherein each first emission group includes at least two rows of first emission sub-electrodes;
in a second time period, controlling a plurality of second emission groups to emit sine wave signals, respectively, and obtaining a second voltage signal, which is generated by the piezoelectric film and collected by the receiver electrodes, wherein the first time period does not overlap with the second time period, and each second emission group includes at least two columns of second emission sub-electrodes; and
determining fingerprint information based on the first voltage signal and the second voltage signal.

16. The method according to claim 15, wherein one row of second emission sub-electrodes are located between two adjacent rows of first emission sub-electrodes; and one column of second emission sub-electrodes are located between two adjacent columns of first emission sub-electrodes; wherein N and M are greater than or equal to 2, four first emission sub-electrodes are arranged to surround one second emission sub-electrode:
the step of controlling a plurality of first emission groups to emit sine wave signals, respectively, includes:
for each first emission group, controlling at least two first signal emission lines to output sine wave signals, respectively, so that sine wave signals emitted by at least two rows of first emission sub-electrodes are focused;
the step of controlling a plurality of second emission groups to emit sine wave signals, respectively, includes:

for each second emission group, controlling at least two second signal emission lines to output sine wave signals, respectively, so that sine wave signals emitted by at least two columns of second emission sub-electrodes are focused.

17. The method according to claim 16, wherein the first emission group includes a third emission sub-electrode, a fourth emission sub-electrode and a fifth emission sub-electrode which are located at two opposite sides of the third emission sub-electrode; the third emission sub-electrode, the fourth emission sub-electrode and the fifth emission sub-electrode are all regarded as the first emission sub-electrodes;

the step of controlling at least two first signal emission lines to output sine wave signals, respectively, so that sine wave signals emitted by at least two rows of first emission sub-electrodes are focused, includes:

controlling the fourth emission sub-electrode and the fifth emission sub-electrode to simultaneously emit out first sine wave signals;

at a preset time point after the fourth emission sub-electrode and the fifth emission sub-electrode emit out the first sine wave signals, controlling the third emission sub-electrode to emit out second sine wave signals, so that the first sine wave signals and the second sine wave signals are focused at a target position;

wherein an orthographic projection of the target position onto the emission electrode layer is located within the third emission sub-electrode.

18. The display device according to claim 14, wherein the receiver electrode layer includes a plurality of receiver sub-electrodes; an orthographic projection of each receiver sub-electrode onto the piezoelectric film covers an orthographic projection of at least one target emission sub-electrode onto the piezoelectric film, and does not cover an orthographic projection of other emission sub-electrode onto the piezoelectric film; the target emission sub-electrode and the other emission sub-electrodes are all regarded as the first emission sub-electrodes or second emission sub-electrodes; and the other emission sub-electrodes are the first emission sub-electrode or the second emission sub-electrode except for the target emission sub-electrode.

19. The display device according to claim 18, wherein each of the first emission sub-electrodes and the second emission sub-electrodes is arranged directly opposite to one receiver sub-electrode; and each receiver sub-electrode transmits a voltage signal through a wire.

20. The display device according to claim 18, wherein each receiver sub-electrode is directly opposite to a plurality of target emission sub-electrodes.

* * * * *